Patented Apr. 21, 1953

2,636,024

UNITED STATES PATENT OFFICE 2,636,024

INHERENTLY PROCESSABLE INTERPOLYMER OF VINYL CHLORIDE, VINYL ACETATE, AND 2-ETHYLHEXYL ACRYLATE

Robert J. Wolf, Cleveland, Ohio, assignor to The B. F. Goodrich Company, New York, N. Y., a corporation of New York No Drawing. Application October 15, 1949, Serial No. 121,631

1 Claim. (Cl. 260—80.5)

The present invention relates to thermoplastic interpolymers obtained by the polymerization of monomeric mixtures containing at least three monomeric components, each in particular proportions, one of which is vinyl chloride, another of which is a vinyl ester of an aliphatic monocarboxylic acid, such as vinyl acetate, and another of which is a higher alkyl acrylate such as an octyl acrylate, which interpolymers possess various new and unique properties, especially in regard to their inherent ease of processing combined with excellent physical properties and their ability to retain their useful properties over a wide temperature range, especially at extremely low temperatures; and it pertains particularly to three-component interpolymers or tripolymers which are so inherently processable as to be easily made into excellent films, sheets, rods, tubes and plates without the extraneous addition of plasticizers.

Vinyl resins such as polyvinyl chloride and copolymers of vinyl chloride with various other monomeric materials such as vinylidene chloride, vinyl acetate, methyl acrylate and diethyl fumarate are well known to the art and are widely used in numerous familiar applications. In using such resins it is the practice to first mix the thermoplastic resin, which itself is relatively hard and horny at normal temperatures and is generally incapable of being easily subjected to processing operations such as milling, calendering and extruding, with a considerable amount of a liquid plasticizer such as di-2-ethylhexyl phthalate or tricresyl phosphate thereby to obtain a plasticized composition which can be easily processed and worked into the desired shape and which, in final use, possesses many properties not found in the resin itself and so essential for adoption of the resin to its many applications.

There are, however, several disadvantages necessarily attending the use of plasticizers. The plasticizers commonly employed are oily, liquid materials which, even when thoroughly mixed and "fluxed" with the vinyl resin, have a tendency to "bleed" or migrate to the surface of the composition where they are lost through volatilization or by wiping, washing or other treatment with the result that the composition gradually stiffens and hardens and consequently fails in service. Moreover, it is difficult to produce a lasting adhesive bond between the surface of a plasticized vinyl resin composition and another surface because the plasticizer migrates to the adhesive layer and destroys the bond. Varnished surfaces are also marred on prolonged contact with an article made of plasticized vinyl resin because of migration of the plasticizer present therein.

Another disadvantage of conventionally plasticized vinyl resin compositions is that they do not have a good "feel" (they are slippery, cold and oily to the touch) and they are not sufficiently limp (a property commonly referred to as "drape") as to fall in graceful folds, as is desirable when the composition is made into curtains, clothing, furniture upholstery and the like.

A still further disadvantage of conventionally plasticized vinyl resin compositions is that they become stiff and brittle at temperatures no lower than —30 to 0° C. such that films, sheets and other articles made therefrom are easily cracked, torn or otherwise damaged in low temperature use, while the same vinyl resin composition is often excessively thermoplastic such that it has low tensile strength and modulus and excessive elongation at elevated temperatures.

It is a primary object of this invention, therefore, to provide a new class of vinyl resins the members of which are possessed of many of the desirable properties possessed by known vinyl resins and plasticized vinyl resin compositions and which are so inherently processable that the addition of extraneous plasticizers is not required for the production of thin films, sheets, rods or tubes and which on that account are capable of being used to produce numerous articles which are more durable, serviceable and otherwise desirable. It is also an especial object to provide new vinyl resins which, without plasticizer, have better resistance to low temperatures and which also have better resistance to high temperatures than conventional plasticized vinyl resin compositions. The attainment of these and still other objects will become apparent in the description of the invention which follows.

I have found that by polymerizing, preferably in aqueous medium, monomeric mixtures containing at least three components, each in definite proportions, one being vinyl chloride, another a vinyl ester of an aliphatic monocarboxylic acid, preferably vinyl acetate, and the third a higher alkyl acrylate, as hereinafter defined, I am able to obtain novel interpolymers which are inherently processable and have the other properties necessary for achieving the above and other objectives. The term "inherently processable" is used herein to denote that property or combination of properties which enables the interpolymers of this invention, whether relatively soft or hard, flexible or stiff at ordinary temperatures, to be easily milled, mixed with compounding ingredients and extruded, calendered, molded or otherwise fabricated into various shapes and forms without the addition of plasticizers and without being heated to excessively high temperatures.

The relative proportions of monomers which are employed in the production of my new interpolymers are somewhat critical, since the desired properties are not secured with these monomers in any proportion, but may vary within certain limits. In the monomeric mixture I have found it necessary to employ from 35 to 90% by weight of vinyl chloride, from 5 to 50% by weight of the vinyl ester, and from 5 to 60% by weight of the higher alkyl acrylate with at least 90% by weight of the monomeric mixture made up of these three ingredients. Other monomeric materials such as vinylidene chloride, diethyl fumarate, acrylonitrile, styrene and the lower alkyl acrylates such as methyl and ethyl acrylates are, if desired, utilizable to the extent of 10% by weight of the mixture but it is preferred that only monomeric materials of the three specified types be present. Particularly valuable are those interpolymers in which the monomeric mixture employed contains from 35 to 80% by weight of vinyl chloride, from 10 to 50% by weight of the vinyl ester, and from 5 to 35% by weight of the higher alkyl acrylate polymerized at a temperature of about 0° C. Other valuable interpolymers may be prepared at these and higher temperatures from monomer mixtures which contain from 45 to 80% by weight of vinyl chloride, from 5 to 30% by weight of a vinyl ester of an aliphatic monocarboxylic acid, and from 5 to 40% by weight of an alkyl acrylate in which the alkyl groups contain a total of eight to ten carbon atoms and possess a carbon chain of 6 to 10 carbon atoms.

Although the preferred vinyl ester is vinyl acetate other vinyl esters of aliphatic monocarboxylic acids also are utilizable. Among these are vinyl propionate, vinyl butyrate, vinyl caprylate, vinyl laurate and vinyl stearate. Vinyl esters of aliphatic monocarboxylic acids containing no more than six carbon atoms in the carbon chain of the acid are ordinarily preferred unless it is desired to produce very soft plastic polymers, as for use in adhesives, in which event vinyl esters of the higher fatty acids are suitable.

The higher alkyl acrylates which are employed in this invention are those alkyl esters of acrylic acid in which the alkyl groups contain a chain of from 5 to 10 carbon atoms. I have found that the degree of plasticity and inherent processability imparted to my new interpolymers by these higher alkyl acrylates is largely determined by the length and configuration of the alkyl group in the alkyl acrylate and that this finding is roughly correlative with the observed degree of plasticization imparted to ordinary vinyl resins by extraneous addition of ester-type plasticizers containing similar alkyl groups. For example, di-2-ethylhexyl phthalate is an excellent plasticizer for vinyl chloride polymers and 2-ethylhexyl acrylate has been found to impart an excellent degree of inherent processability to its interpolymers with vinyl chloride and vinyl esters. Illustrative higher alkyl acrylates within the above class which are utilizable in this invention include n-amyl acrylate, n-hexyl acrylate, isoheptyl acrylate, n-heptyl acrylate, capryl acrylate (1-methylheptyl acrylate), n-octyl acrylate, isooctyl acrylates such as 6-methylheptyl acrylate, n-nonyl acrylate, isononyl acrylates such as 3,5,5-trimethylhexyl acrylate, n-decyl acrylate and others.

It is greatly preferred to employ higher alkyl acrylates in which the alkyl group contains a total of 8 to 10 carbon atoms and possesses a carbon chain of 6 to 10 carbon atoms. Compounds within this class are 6-methylheptyl acrylate, 3,5,5-trimethylheptyl acrylate, 2-ethylhexyl acrylate, 1-methylheptyl acrylate, n-octyl acrylate and others. These acrylates impart excellent inherent processability to my new interpolymers, n-octyl acrylate being the most proficient acrylate in this respect.

The polymerization of my new interpolymers may be carried out in any conventional manner although polymerization in aqueous emulsion, which may or may not contain an added emulsifying agent, is of course essential when it is desired to secure the interpolymer in latex form. In addition to this preferred method, the mixture of monomers may be polymerized in solution in a suitable solvent for the monomers, such as acetone, in which event the polymer precipitates from the solvent in granular form. Interpolymers in the form of fine granules are also secured by the so-called "pearl" type polymerization method in which the monomers are polymerized in an aqueous medium in the presence of colloidal suspension agents such as gelatin, bentonite clay, polyvinyl alcohol, polyacrylic acid or the like. The polymerization may also be carried out in the absence of any solvent or diluent to yield a solid mass of the interpolymer. When a tripolymer is desired for the production of clear, transparent sheets and films, it is preferred to polymerize the mixture of monomers in an aqueous medium containing a very small amount only of an emulsifying agent or none at all, such a method being a "soapless" polymerization reaction. The "pearl" type suspension method is a satisfactory method for producing polymer for uses where clarity and transparence are not of highest importance but where high strength and other excellent physical properties possessed by high molecular weight polymers are essential.

Whatever method of polymerization is employed the catalyst may be any of the catalysts commonly employed for the polymerization of vinyl and vinylidene compounds. Actinic radiation may be employed, as well as the various peroxygen compounds such as hydrogen peroxide, benzoyl peroxide, o,o'-dichlorobenzoyl peroxide, caproyl peroxide, caprylyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, sodium, potassium and ammonium persulfates, sodium perborate, sodium percarbonate and others.

The above class of peroxygen catalysts reach their fullest activity when used in combination with a reducing substance in what is commonly referred to as a "redox" catalyst. The oxidizing and "redox" catalysts are also greatly activated by the presence of a small amount of a heavy metal salt. For example, the copending applications of G. W. Smith, Serial Nos. 779,411, 779,412 and 779,413, filed October 11, 1947, disclose the activation of potassium persulfate with, respectively, the combination of silver ion and ammonia, silver ion itself, and the combination of silver ion and water-soluble oxalates. The copending application of V. L. Folt, Serial No.

778,044, filed October 4, 1947, discloses the activation of a persulfate catalyst with minute amounts of copper ions and sulfite ions to produce a "soapless" polymerization. All of these methods and others known to the art, are utilizable in the production of my new interpolymers.

In some cases it is desirable to control the hydrogen ion concentration of the polymerization mixture, which due to the presence of vinyl chloride tends to liberate HCl during polymerization. It is preferred, therefore, that a buffering substance be added to the polymerization medium. For this purpose, sodium carbonate, sodium bicarbonate, disodium phosphate ($Na_2HpO_4$), trisodium phosphate, lead acetate, ammonium hydroxide, sodium hydroxide, the amino-substituted alcohols such as 2-amino-2-methyl-1-propanol and others are suitable.

Any of the usual emulsifying agents may be employed when the polymerization is carried out in aqueous emulsion. Ordinary soaps such as the alkali metal, ammonium and alkanol amine salts of fatty acids including sodium oleate, sodium myristate, sodium or potassium palmitate, ammonium stearate, ethanol amine laurate, and the like as well as the alkali metal salts of rosin and dehydrogenated (disproportionated) rosin acids may be used; but more useful latices are secured with the synthetic saponaceous materials including hymolal sulfates and sulfonates of the formula

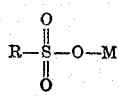

and

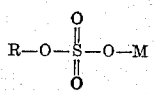

wherein R is an aliphatic hydrocarbon radical of 12 to 18 carbon atoms and M is an alkali metal, such as sodium lauryl sulfate, sodium cetyl sulfate, the sodium salts of sulfonated hydrocarbon fractions, the sodium salts of dodecane-1-sulfonic acid, octadecane-1-sulfonic acid, etc.; alkaryl sulfonates, such as sodium alkyl benzene sulfonates, sodium isopropyl naphthalene sulfonate, sodium isobutyl naphthalene sulfonate, and the like; alkali metal salts of sulfonated dicarboxylic acid esters and amides such as sodium dioctyl sulfosuccinate, sodium-N-(1,2-dicarboxyethyl) succinamate, the sodium salt of N-octadecyl-sulfosuccinamate and the like; the salts of organic bases containing long carbon chains, for example, the hydrochloride of diethylaminoethyloleylamide, lauryl amine hydrochloride, trimethyl cetyl ammonium bromide, and the like. Salts of organic bases (also called cationic soaps) give acidic emulsions and ordinary soaps (anionic soaps) give alkaline emulsions whereas the sulfonates and sulfates, which are particularly preferred, may be utilized in emulsions over a wide pH range. In addition to the above polar or ionic emulsifiers, still other materials which may be used singly or in combination with one or more of the above-named emulsifying agents include non-ionic emulsifiers such as the polyether alcohols prepared by condensing ethylene oxide with higher alcohols or the like.

While the polymerization may be carried out in the presence of air, the rate of reaction is ordinarily faster in the absence of oxygen and hence, polymerization in an evacuated reaction vessel or under an inert atmosphere such as nitrogen is preferred. The temperature at which the polymerization is carried out is not critical, it may be varied widely from −30° C. or lower to as high as 100° C. or higher, with suitable choice of catalyst, though a practical operating range, especially with aqueous emulsion systems, is at a temperature of about 0° to about 70° C.

In order to minimize variation in the rate of reaction and to maintain a given proportion of each of the monomers in the mixture throughout the polymerization reaction (and thereby improve the homogeneity of the product), and especially when conducting the polymerization of large batches of monomers in aqueous emulsion in the presence of the powerful "redox" catalysts, it is desirable to introduce the vinyl ester and/or the higher acrylate gradually during the course of the polymerization. By the latter method the reaction may be made to proceed at a rate consistent with the heat transfer capacity of the polymerization vessel. The polymerization in aqueous emulsion also may be effected in the presence of a calculated amount of seed latex in order to obtain larger particles and greater fluidity for a given latex total solids content. If the amount of emulsifier in the aqueous emulsion is carefully controlled at somewhat less than the amount necessary to provide a monomolecular film of emulsifier on the latex particles, the initiation of new particles will be suppressed and the growth of larger more uniform latex particles will be favored. By these latter methods a latex of the interpolymers of this invention may be made having the high fluidity and over 50% total solids greatly desired in a latex for use as such in coating and dipping processes.

The preparation of the interpolymers of this invention will be more clearly described in the following specific examples which are intended merely as illustrations of the nature of my invention and not as limitations on the scope thereof.

Example 1

An aqueous emulsion was prepared according to the following recipe, in which parts are by weight:

| | |
|---|---|
| Vinyl chloride | 55.00 |
| Iso-octyl acrylate | 30.00 |
| Vinyl acetate | 15.00 |
| Potassium persulfate | 0.50 |
| Emulsifier[1] | 4.00 |
| Ammonia ($NH_3$) | 0.20 |
| Water (distilled) | 95.30 |

[1] A sodium derivative of a sulfonated petroleum fraction known commercially as "Duponol MP 189–S."

The water, emulsifying agent, and potassium persulfate were charged to a reactor and the reactor was sealed and evacuated. The ammonia and monomers were then charged into the reactor and the resulting emulsion then heated to 50° C. with constant agitation. Polymerization of the emulsified monomer mixture started rapidly and proceeded to completion in 7 hours. The product was a stable latex containing 50.6% total solids and no coagulum. The latex was coagulated by the addition of salt and acid to yield a solid resinous tripolymer in particulate form.

The tripolymer particles were placed on a roll mill and were found to band into a smooth, clear and plastic sheet with a mill roll temperature of but 150 to 160° F. thereby showing its high degree of inherent processability. By way of comparison conventional vinyl resins must be mill mixed with plasticizer at temperatures in excess of 240° F. in order to form smooth sheets. The milled sheet of tripolymer was soft and flexible at room temperature, in fact it was sufficiently limp as to be characterized as having good "drape."

The particulate tripolymer of this example was also mixed with stabilizers consisting of 2.0 parts of strontium naphthenate and 0.5 part of lead stearate per 100 parts of resin molded for 3 minutes at 345° F., and then tested to determine its physical properties. Its tensile strength was found to be 2,000 lbs./sq. in., its elongation 200%, its modulus at 100% elongation was 1,700 lbs./sq. in., its crescent tear resistance was 390 lbs./in., and its A. S. T. M. brittleness point was −40° F.

At 125° F., the tripolymer composition had a 100% modulus 66% of its modulus at room temperature while a polyvinyl chloride composition plasticized with 50 parts of di-2-ethylhexyl phthalate per 100 parts of resin had a 100% modulus at 125° F. only 33% of its modulus at room temperature. The importance of this property is that the tripolymer retains considerably more of its "snap" at elevated temperatures than does the conventional plasticized polyvinyl chloride.

Example 2

An emulsion was prepared as follows, the proportions being parts by weight:

| | |
|---|---|
| Vinyl chloride | 45.00 |
| Iso-octyl acrylate | 40.00 |
| Vinyl acetate | 15.00 |
| Emulsifier[1] | 4.00 |
| Potassium persulfate | 1.00 |
| Sodium thiosulfate | 0.50 |
| Water | 150.00 |

[1] Same as in Example 1.

The mixture was agitated for 3½ hours at a temperature of 0° C. to obtain a yield of 90% of polymer in the form of an excellent latex containing 37.1% total solids.

The solid tripolymer derived by coagulation of the latex of Example 2 was found to mill into smooth clear sheets with mill roll temperatures of only 150° F. A sample of the milled tripolymer molded for 3 minutes at 345° F. was found to have a hardness of 82 (Duro. A at 30° C.), a brittleness temperature of −70° F. (conventional plasticized polyvinyl chloride has a brittleness temperature of 0 to −35° F.), a tensile strength at room temperature of 1600 lbs./sq. in. and at 125° F. of 2000 lbs./sq. in., an elongation at room temperature of 220% and at 125° F. of 250%, and a crescent tear strength at room temperature of 350 lbs./sq. in.

Thin films calendered from the solid tripolymer or cast directly from the latex of this Example 2 and then fused at 100 to 125° C. were flexible, clear and had excellent "drape." The excellent low temperature properties and the strength characteristics of the tripolymer coupled with the fact that the film contains no extractable plasticizer (and therefore does not suffer deterioration upon aging or exposure to heat and the elements) makes the tripolymer of this example ideally suited for use in the form of films, in a variety of applications in which conventional plasticized vinyl resin films do not render satisfactory service. In the latter regard, a raincoat, shower curtain or food package made of a film of or coated with the tripolymer of this example does not stiffen, tear, or otherwise lose its desirable properties after long periods of use.

Examples 3 to 6

Polymer latices were made by polymerizing the emulsified monomers contained in aqueous emulsions prepared according to the following recipe:

| | Parts wt. |
|---|---|
| Vinyl chloride | 35.00 |
| Acrylate (variable in kind) | 35.00 |
| Vinyl acetate | 30.00 |
| Emulsifier[1] | 4.00 |
| Potassium persulfate | 1.00 |
| Sodium thiosulfate | 0.50 |
| Water | 150.00 |

[1] Same as in Example 1.

The polymerization was conducted in each case in the manner shown by Examples 1 and 2. In Example 3, the acrylate compound used was 2-ethylhexyl acrylate. This polymerization resulted in a yield in excess of 90% in 4 hours at 0° C. The solid tripolymer derived by coagulation of the latex could be banded into smooth, clear, and transparent sheets at mill roll temperatures of only 140 to 150° F. The tripolymer was found to have a brittleness point of −70° F., and excellent tensile strength and elongation.

In Example 4, the acrylate compound was isononyl acrylate. The polymerization proceeded to a yield in excess of 90% in 4 hours at 0° C. and yielded a stable latex. The tripolymer could be milled or masticated with a mill roll temperature of 160 to 170° F. and formed into clear, strong and flexible films and sheets without the addition of plasticizers. The solid tripolymer was slightly harder than that of Example 3 but could be used in the form of thin films, sheets, etc.

In Example 5, the acrylate compound was n-octyl acrylate. The reaction proceeded to substantial completion in 5 hours at 0° C. and yielded an excellent stable latex. The tripolymer was softer than any of the tripolymers of Examples 1 to 4 it having a hardness of about 85 durometer A. The tripolymer was very plastic, it being capable of being milled at roll temperatures of only 140 to 150° F. Films cast from the latex needed only to be heated to 100° C. to become clear and homogeneous. The films of this tripolymer whether cast directly from the latex or calendered from the solid polymer were exceedingly flexible and soft to the touch.

The tripolymer of Example 6, was made using n-heptyl acrylate. The tripolymer was very similar to those of Examples 3 to 5 in that it could be milled, extruded or calendered without plasticizer to form somewhat tougher films and sheets. This tripolymer had a brittleness temperature of −40° F.

Example 7

A tripolymer was prepared by the polymerization at 0° C. in the manner of Example 2 of a monomeric mixture consisting of 45 parts vinyl chloride, 25 parts 2-ethylhexyl acrylate and 30 parts of vinyl acetate. The resulting tripolymer was found to be easily milled with mill roll temperatures of only 150 to 180° F. It was mixed with 0.5% by weight of lead stearate and 2% by weight of strontium naphthenate and the resulting composition press molded for 2 minutes at 300° F. Determination of the physical properties of the press molded sheets revealed an unusual combination of properties. Though the tripolymer composition was relatively harder and stiffer than the tripolymer of Example 2, it had sufficient low temperature flexibility to pass the A. S. T. M. freeze test at −60 to −70° F. The other physical properties were equally as surprising. For example, the room temperature properties were tensile strength 2000 lbs./sq. in., elongation 220%, and modulus at 100% elongation 1900 lbs./sq. in., while the same properties of a sample heated to 125° F. were tensile strength 2400 lbs./sq. in., elongation 270%, and 100% modulus 1600 lbs./sq. in. Thus the tripolymer of this example although somewhat stiff and hard at normal temperatures, had excellent low temperature flexibility and excellent high temperature strength.

Example 8

Still other interpolymers were made varying the proportions of the various monomeric materials. The polymerization recipe and procedure was similar to that of Example 2. A tripolymer made using a monomeric mixture consisting of 70% by weight of vinyl chloride, 15% n-octyl acrylate and 15% vinyl acetate, was a material which resembled polyvinyl chloride plasticized with 30 to 40 parts per 100 parts of resin of di-2-ethylhexyl phthalate in its hardness and flexibility at room temperature, yet could be milled, extruded, calendered and molded without the addition of plasticizer. A tripolymer made from a monomeric mixture consisting of 80% by weight of vinyl chloride, 10% vinyl acetate and 10% n-octyl acrylate was a material which when milled or extruded without plasticizer was relatively hard and very rigid, yet which evidenced inherent processability to a high degree. This hard tripolymer was found to band into a homogeneous composition on a two roll plastic mill in 5 to 8 minutes at 200° F. Polyvinyl chloride, on the other hand, requires mixing temperatures of 280° F., during milling operations. When mixed with only 0.5% by weight on the resin of carnauba wax and 2% of a mixture of barium ricinoleate and cadmium naphthenate this tripolymer could be extruded with a neutral screw, a back cylinder temperature of 200 to 220° F., and a die tip temperature of only 210 to 220° F. to form hard, rigid rods and tubes. Polyvinyl chloride plasticized to a similar hardness requires very high extrusion temperatures, the back cylinder temperature in this case being maintained at 325 to 350° F. and the die tip at 390 to 400° F. As a further demonstration of the high degree of inherent processability of this tripolymer, the tripolymer composition could be calendered, after a warm up at 200° F., having the calender rolls maintained at only 240 to 250° F. By contrast, plasticized polyvinyl chloride of similar hardness requires roll temperatures of at least 350° F. during calendering operations.

The 80-10-10 tripolymer described above, in the form of its latex deposited on paper excellent glossy coatings of about 0.3 mil thickness and when spread on a smooth surface formed an excellent, clear glossy film of about 4 mils in thickness. Both coatings and unsupported films made from this latex required heating for only 5 minutes at 135° C. for fusion. Among the advantages of this tripolymer as a paper coating material or as an unsupported film were its surprisingly good low temperature flexiblity, its ability to retain its strength at high temperatures, and its resistance to stiffening upon heat aging or exposure to light.

The above-described processing operations performed on the 80-10-10 tripolymer of Example 8 illustrate the unusual inherent processability possessed by the interpolymers of this invention, even by the interpolymers made from monomeric mixtures relatively high in vinyl chloride content and containing relatively minor proportions of vinyl ester and higher alkyl acrylate. Such inherent processability, coupled with hardness and rigidity is possessed by the interpolymers made from monomeric mixtures containing from 60 to 90% by weight of vinyl chloride together with 5 to 15% by weight of the vinyl ester and 5 to 25% of the higher alkyl acrylate. Interpolymers, of course, made from monomeric mixtures containing less than 60% of vinyl chloride and relatively larger amounts of the other two types of monomers have this same inherent processability to an even greater degree and, in addition, are soft, plastic, flexible materials. For example, a tripolymer made from a monomeric mixture consisting of 35% vinyl chloride, 55% isooctyl acrylate and 10% of vinyl acetate was a very soft tacky material which could be processed without plasticizer and was ideally suited for use in adhesives and coating compositions.

Interpolymers closely similar to those described above are obtained when up to 10% of acrylonitrile, vinylidene chloride, styrene or a lower alkyl acrylate is polymerized along with a mixture containing the described proportions of vinyl chloride, higher acrylate and vinyl acetate. However, the use of these fourth monomers does not generally result in additional valuable properties and it is preferred, therefore, to produce interpolymers from monomeric mixtures containing only vinyl chloride, vinyl ester and higher alkyl acrylate.

While there has been disclosed with considerable detail certain preferred embodiments of the invention, it is to be understood that the invention is not limited solely thereto for, as disclosed, it is possible to make variations and modifications therein without departing from the spirit and scope of the invention as defined in the appended claim.

I claim:

A tripolymer made by polymerizing in aqueous emulsion at about 0° C., a monomeric mixture consisting of from 45 to 80% by weight of vinyl chloride, from 10 to 30% by weight of vinyl acetate, and from 5 to 35% of 2-ethylhexyl acrylate.

ROBERT J. WOLF.

References Cited in the file of this patent

UNITED STATES PATENTS

| Number | Name | Date |
| --- | --- | --- |
| 2,462,422 | Plambeck, Jr. | Feb. 22, 1949 |

OTHER REFERENCES

Modern Plastics, September 1947, pp. 128 and 129.

Mason and Manning, "The Technology of Plastics and Resins," Van Nostrand & Co., N. Y. (1945), page 249.